(12) United States Patent
Keeney et al.

(10) Patent No.: US 8,858,379 B2
(45) Date of Patent: Oct. 14, 2014

(54) AXLE ASSEMBLY HAVING AN ELECTRIC MOTOR MODULE

(71) Applicant: ArvinMeritor Technology, LLC, Troy, MI (US)

(72) Inventors: Christopher Keeney, Troy, MI (US); Mark Christopher Smith, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 169 days.

(21) Appl. No.: 13/624,070

(22) Filed: Sep. 21, 2012

(65) Prior Publication Data

US 2014/0087906 A1   Mar. 27, 2014

(51) Int. Cl.
*F16H 48/08*   (2006.01)

(52) U.S. Cl.
USPC ........................................... 475/150

(58) Field of Classification Search
CPC ..................................................... F16H 48/08
USPC ............................. 475/9, 150, 151, 152, 230
See application file for complete search history.

(56) References Cited

U.S. PATENT DOCUMENTS

| | | | |
|---|---|---|---|
| 7,028,583 B2 | 4/2006 | Bennett | |
| 7,115,057 B2 | 10/2006 | House | |
| 7,115,058 B2 | 10/2006 | Duncan | |
| 7,297,083 B2 | 11/2007 | Duncan | |
| 7,410,017 B2 | 8/2008 | Gradu | |
| 7,543,665 B2 | 6/2009 | Zwilling et al. | |
| 7,559,390 B2 | 7/2009 | Marsh et al. | |
| 7,588,508 B2 | 9/2009 | Marsh et al. | |
| 7,931,103 B2 | 4/2011 | Morrow et al. | |
| 8,113,308 B2 | 2/2012 | Rodriguez et al. | |
| 2006/0046887 A1* | 3/2006 | Bennett | 475/150 |
| 2007/0254765 A1 | 11/2007 | Marsh et al. | |
| 2009/0258747 A1* | 10/2009 | Iwase et al. | 475/150 |
| 2012/0238387 A1 | 9/2012 | Stuart | |

FOREIGN PATENT DOCUMENTS

| | | |
|---|---|---|
| EP | 0079455 A1 | 5/1983 |
| WO | 2012098957 A1 | 7/2012 |
| WO | 2013029682 A1 | 3/2013 |
| WO | 2013029683 A1 | 3/2013 |

OTHER PUBLICATIONS

European Patent Office, Extended Search Report for the corresponding European Patent Application No. 13275222.1 mailed Jan. 28, 2014.

* cited by examiner

*Primary Examiner* — Edwin A Young

(74) *Attorney, Agent, or Firm* — Brooks Kushman P.C.

(57) ABSTRACT

An axle assembly having an electric motor module. The electric motor module may be coupled to a differential assembly. A rotor of the electric motor module may be coupled to a pinion of the differential assembly with a first coupling.

20 Claims, 5 Drawing Sheets

US 8,858,379 B2

AXLE ASSEMBLY HAVING AN ELECTRIC MOTOR MODULE

TECHNICAL FIELD

The present application relates to an axle assembly having an electric motor module.

BACKGROUND

An axle assembly with electric motors is disclosed in U.S. Pat. No. 7,028,583.

SUMMARY

In at least one embodiment, an axle assembly is provided. The axle assembly may include a differential assembly, a first coupling, and an electric motor module. The differential assembly may have a pinion. The first coupling may be fixedly coupled to the pinion. The electric motor module may include a motor housing, a stator, and a rotor. The motor housing may be coupled to the differential assembly. The stator may be disposed proximate the motor housing. The rotor may be fixedly coupled to the first coupling.

In at least one embodiment, an axle assembly is provided. The axle assembly may include a differential assembly, a first coupling, and an electric motor module. The differential assembly may include a pinion that may be configured to rotate about an axis of rotation. The first coupling may be fixedly disposed on the pinion. The electric motor module may include a motor housing, a stator, a rotor, and a second coupling. The motor housing may be coupled to the differential assembly. The stator may be disposed proximate the motor housing. The rotor may be fixedly coupled to the first coupling. The second coupling may be fixedly coupled to the first coupling. The first and second couplings may rotate with the pinion about the axis of rotation.

In at least one embodiment, an axle assembly is provided. The axle assembly may include a differential assembly, a first coupling, and an electric motor module. The differential assembly may include a pinion that may be configured to rotate about an axis of rotation. The first coupling may have a hole that receives the pinion. The electric motor module may be disposed proximate the differential assembly and may include a motor housing, a stator, a second coupling, and a rotor. The motor housing may be fixedly positioned with respect to the differential assembly. The stator may be disposed in the motor housing. The second coupling may be fixedly coupled to the first coupling. The rotor may be fixedly coupled to the first and second couplings. The rotor may rotate about the axis of rotation with the first and second couplings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
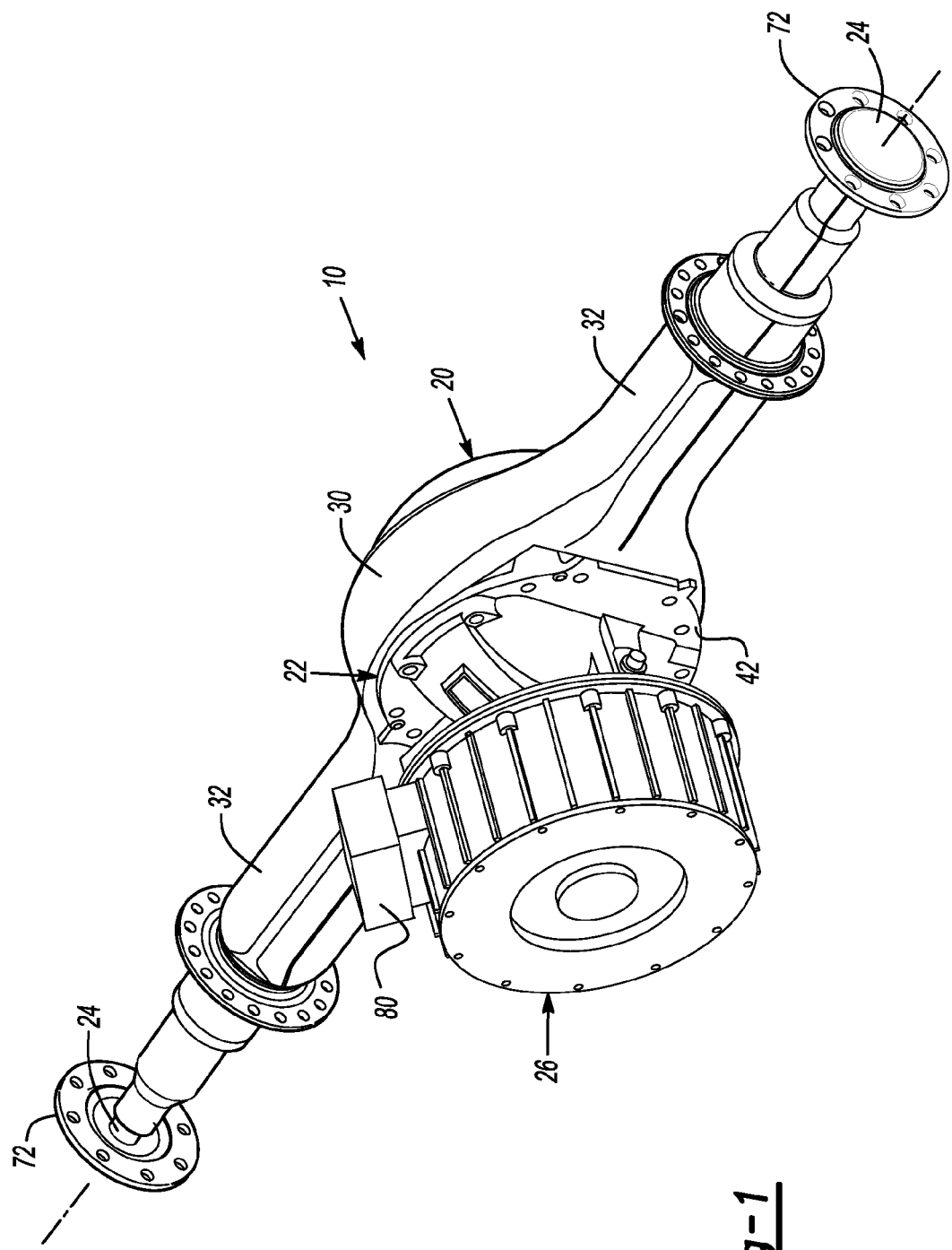
FIG. 1 is a perspective view of an axle assembly.

Referring to FIG. 1, an exemplary axle assembly 10 is shown. The axle assembly 10 may be provided with a motor vehicle like a truck, bus, farm equipment, military transport or weaponry vehicle, or cargo loading equipment for land, air, or marine vessels.

The axle assembly 10 may provide torque to one or more traction wheel assemblies that may include a tire mounted on a wheel. The axle assembly 10 may or may not receive torque from a vehicle drivetrain component, such as an internal combustion engine and/or transmission. For example, the axle assembly 10 shown in FIG. 1 is not mechanically coupled to the output of an engine, transmission, or another axle assembly that may provide torque. The axle assembly 10 may also be configured to provide regenerative braking capability in one or more embodiments. Regenerative braking may capture kinetic energy when used to brake or slow the velocity of the vehicle. Recovered energy may be used to charge an electrical power source.

In at least one embodiment, the axle assembly 10 may include an axle housing 20, a differential assembly 22, at least one axle 24, and an electric motor module 26.

The axle housing 20 may receive various components of the axle assembly 10. In addition, the axle housing 20 may facilitate mounting of the axle assembly 10 to the vehicle. The axle housing 20 may include multiple housing components that may be assembled together in any suitable manner, such as by welding and/or with one or more fasteners. The axle housing 20 may at least partially define a center portion 30 and at least one arm portion 32.

The center portion 30 may be disposed proximate the center of the axle housing 20. The center portion 30 may define a cavity that may receive at least a portion of the differential assembly 22.

One or more arm portions 32 may extend from the center portion 30. In FIG. 1, two arm portions 32 are provided that extend in opposite directions from the center portion 30 and the differential assembly 22. An arm portion 32 or a portion thereof may be integrally formed with the center portion 30 in one or more embodiments. Each arm portion 32 may define an internal arm cavity that may receive an axle 24.

The differential assembly 22 may be disposed between the axle housing 20 and the electric motor module 26. In at least one embodiment, the differential assembly 22 may include a differential 40 and a differential carrier 42.

The differential 40 may be configured to transmit torque to the vehicle traction wheel assemblies and permit the traction wheel assemblies to rotate at different velocities. The differential 40 may be at least partially disposed in the center portion 30 of the axle housing 20. A pinion 50 and a ring gear 52 of the differential 40 are highlighted in FIGS. 3-5 to facilitate an abbreviated discussion of the operation of the differential 40.

The pinion 50 may be coupled to at least one torque source. For example, the pinion 50 may receive torque from the electric motor module 26 and/or a vehicle drivetrain component or another axle assembly as previously discussed. The pinion 50 may be rotatably supported by one or more bearings and may rotate about an axis of rotation 54. Torque that is provided to the pinion 50 may be transmitted to the ring gear 52. Torque may be transmitted from the ring gear 52 to each axle 24 and from each axle 24 to at least one corresponding wheel hub and/or traction wheel assembly.

The pinion 50 may include a pinion shaft 56 and a pinion gear 58. The pinion shaft may extend along the axis of rotation 54. The pinion shaft 56 may be generally cylindrical and may include a threaded portion and a spline. The threaded portion may be disposed proximate an end of the pinion shaft 56. The spline may be disposed on an external surface and may be disposed between the end of the pinion shaft 56 and the pinion gear 58. The pinion gear 58 may be disposed at an end of the pinion shaft 56 opposite the threaded portion. The pinion gear 58 may have gear teeth that mate with gear teeth on the ring gear 52.

The differential carrier 42 may support the differential 40 and facilitate mounting of the differential assembly 22 to the axle housing 20. For example, the differential carrier 42 may be disposed proximate the center portion 30 and may be coupled to the axle housing 20 in any suitable manner, such as with one or more fasteners like a bolt. The differential carrier 42 may cooperate with the axle housing 20 to receive and enclose the differential 40. The differential carrier 42 may include a pinion bearing cage 60.

The pinion bearing cage 60 may be integrally formed with or may be fixedly coupled to the differential carrier 42. For example, the pinion bearing cage 60 may be fixedly mounted to the differential carrier 42 in any suitable manner, such as with one or more fasteners 62. The fasteners 62 may be standardized or commonized with other axle assembly fasteners in one or more embodiments. The pinion bearing cage 60 may be spaced apart from the pinion 50 and may define an opening 64 through which the pinion 50 extends. One or more bearings, such as the first bearing 66 and a second bearing 68 may be disposed in the opening 64 and may rotatably support the pinion 50. For instance, the first and second bearings 66, 68 may engage an external surface of the pinion shaft 56 and a surface of the pinion bearing cage 60 that may define the opening 64. The first and second bearings 66, 68 may be spaced apart from each other and may be disposed between the end of the pinion shaft 56 and the pinion gear 58.

A seal assembly 70 may be disposed in the opening 64 to help inhibit leakage of a bearing lubricant, such as oil, from the opening 64 into the electric motor module 26.

Referring again to FIG. 1, one or more axles 24 may transmit torque from the differential assembly 22 to a traction wheel assembly. In FIG. 1, two axles 24 are provided such that each axle 24 extends through a different arm portion 32 of the axle housing 20. The axles 24 may extend along and may be rotated about an axis by the differential 40. Each axle 24 may have a first end and a second end. The first end may be coupled to the differential 40. The second end may be disposed opposite the first end and may be located outside of the axle housing 20. More specifically, the second end may extend through a hole that may be provided at an end of an arm portion 32. In at least one embodiment, the axles 24 may be configured as a solid or "live" axle that may not be provided with an independent suspension system. In such an embodiment, an axle coupling 72 may be disposed at the second end and may facilitate mounting of a wheel hub and/or traction wheel assembly. Alternatively, the axles 24 may be configured for use with an independent suspension system. For instance, one or more joints, such as constant-velocity joints may be provided with an axle 24 to facilitate relative movement between a wheel assembly and the differential 40. An axle bearing may be provided between the first and second ends of the axle 24 to rotatably support the axle 24.

The electric motor module 26 may be spaced apart from the axle housing 20 and may be disposed proximate the differential assembly 22. The electric motor module 26 may be electrically coupled to a power source, such as a battery and/or capacitor that may provide and/or store electrical energy. For instance, an electrical connector module 80 may be provided with the electric motor module 26 to facilitate electrical coupling. The electric motor module 26 may provide torque to the pinion 50 when an electrical current is received. In addition, the electric motor module 26 may generate electrical current in response to rotation of the pinion 50. For example, electrical current may be generated during regenerative braking or when the pinion 50 is rotated by a nonelectrical power source, such as an internal combustion engine. In at least one embodiment, the electric motor module 26 may include a motor housing 90, a stator 92, a rotor 94, a first coupling 96, and a second coupling 98.

Figure 2:
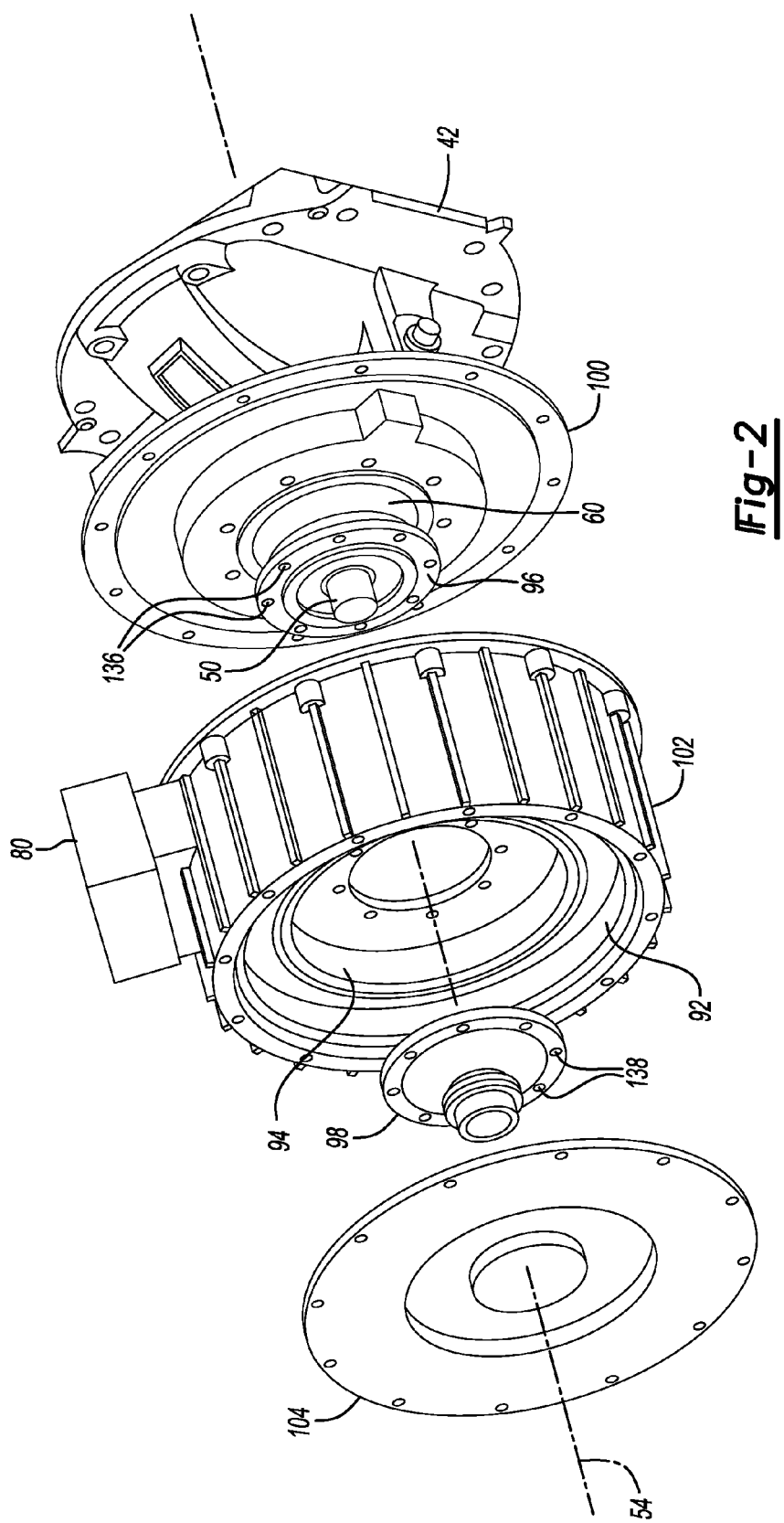
FIG. 2 is an exploded view of the axle assembly of FIG. 1.
Figure 3:
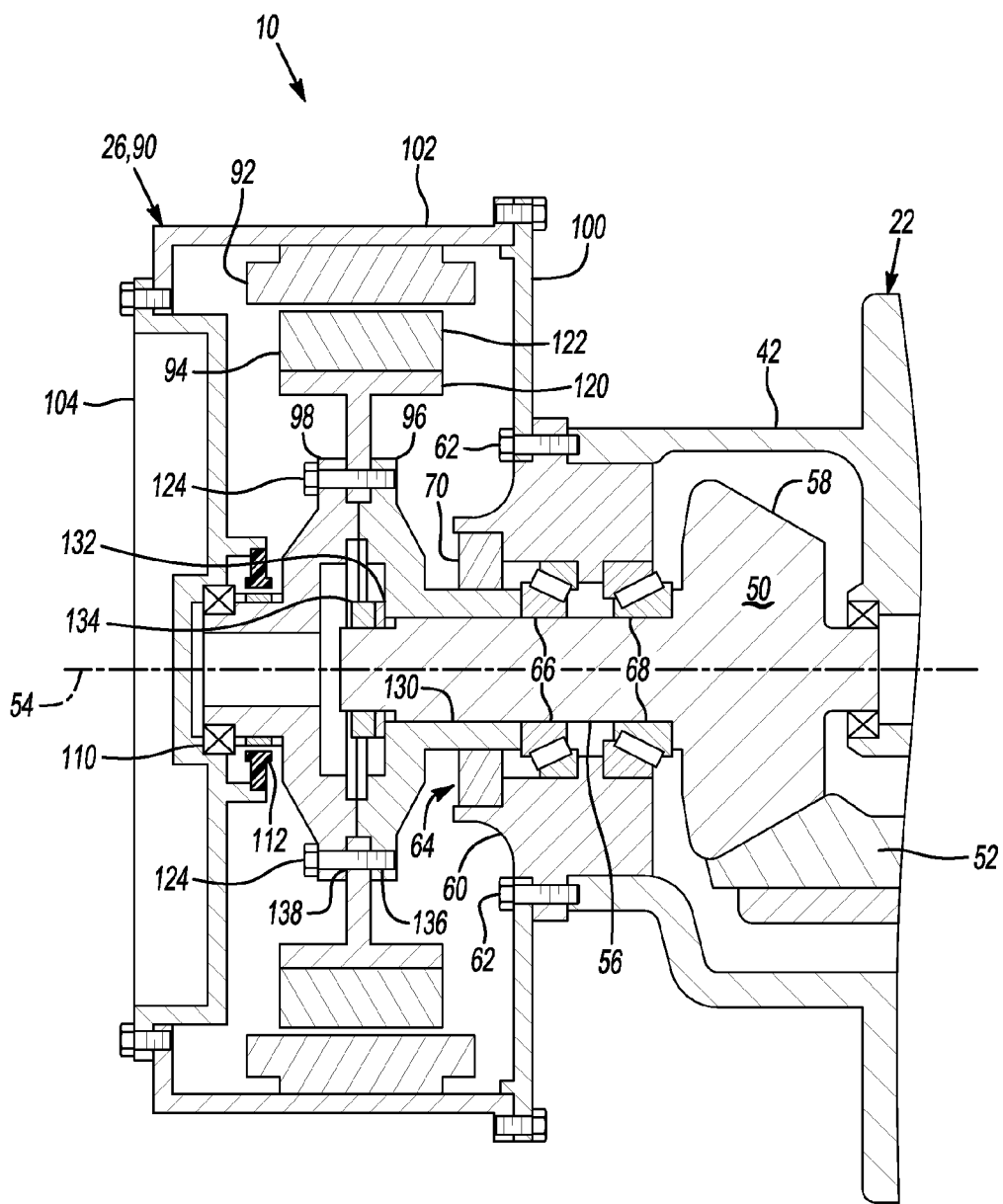
FIG. 3 is a section view of the axle assembly of FIG. 1 along section line 3-3.

Referring to FIGS. 2 and 3, the motor housing 90 may receive and/or support components of the electric motor module 26. The motor housing 90 may be fixedly positioned with respect to differential assembly 22. For example, the motor housing 90 may be fixedly coupled to the pinion bearing cage 60 and/or the differential carrier 42. The motor housing 90 may include one or more components. In at least one embodiment, the motor housing 90 may include an adapter plate 100, an outer plate 102, and a cover plate 104.

The adapter plate 100 may be disposed proximate the differential assembly 22. The adapter plate 100 may be fixedly coupled to the pinion bearing cage 60 and/or the differential carrier 42 in any suitable manner, such as with one or more fasteners. In addition, the adapter plate 100 may be integral with the pinion bearing cage 60 in one or more embodiments.

The outer plate 102 may extend between the adapter plate 100 and the cover plate 104. In at least one embodiment, the outer plate 102 or portion thereof may extend around the axis of rotation 54. The outer plate 102 may support the stator 92.

The cover plate 104 may be disposed opposite the adapter plate 100. The cover plate 104 may be fixedly mounted to the outer plate 102 in any suitable manner, such as with one or more fasteners. The cover plate 104 may be provided in various configurations as will be discussed in more detail below. In the embodiment shown in FIG. 3, the cover plate 104 receives a support bearing 110 that rotatably supports the second coupling 98. The support bearing 110 may extend from the cover plate 104 to the second coupling 98 and may be radially disposed with respect to the axis of rotation 54. A speed sensor 112 may be provided to detect a rotational speed of a component that rotates about the axis of rotation 54, such as the first or second couplings 96, 98. The speed sensor 112 may be disposed in the motor housing 90. For example, the speed sensor 112 may be coupled to the cover plate 104 as shown in FIG. 3 or may be disposed on an opposite side of the rotor 94.

The stator 92 may be fixedly disposed in the motor housing 90. For example, the stator 92 may be disposed on or proximate to an internal surface of the outer plate 102. The stator 92 may be radially disposed about the axis of rotation 54 and may include a plurality of windings as is known by those skilled in the art.

The rotor 94 may be spaced apart from but disposed in close proximity to the stator 92. The rotor 94 may rotate with respect to the stator 92 and may include a rotor mounting plate 120 and one or more rotor elements 122, such as magnets or windings or ferromagnetic material, all of which are generically referenced with reference number 122. The rotor mounting plate 120 may be configured as a ring that extends around the axis of rotation 54. In at least one embodiment, the rotor mounting plate 120 may have a generally T-shaped cross section. The rotor mounting plate 120 may be fixedly coupled to the first coupling 96 and/or the second coupling 98. For instance, a first portion of the rotor mounting plate 120 that extends toward or substantially perpendicular to the axis of rotation 54 may be disposed between and may engage the first and/or second couplings 96, 98. The rotor mounting plate 120 may be coupled to the first and or second couplings 96, 98 in any suitable manner, such as with a set of fasteners 124. The fasteners 124 may be spaced apart from each other and radially disposed about the axis of rotation 54. A second portion of the rotor mounting plate 120 may support the rotor element 122. The rotor element 122 may be disposed on the rotor mounting plate 120 adjacent to the stator 92. If magnets are provided, the magnets 122 may be permanent magnets. A ferromagnetic material may not be permanently magnetized.

The first coupling 96 may be fixedly coupled to the pinion 50. For example, the first coupling 96 may have a hole 130 through which the pinion shaft 56 extends. A spline may be provided in the hole 130 that mates with the spline on the pinion shaft 56. As such, the mating splines may cooperate to inhibit rotation of the first coupling 96 with respect to the pinion 50. One or more fasteners, such as a washer 132 and a nut 134, may be provided to inhibit axial movement of the first coupling 96 with respect to the pinion 50. For instance, the washer 132 and nut 134 may be disposed between the first and second couplings 96, 98. The washer 132 may engage the first coupling 96 and the nut 134 may be threaded onto the threaded portion of the pinion shaft 56. The first coupling 96 may be disposed in the motor housing 90 and may at least partially extend into the opening 64 of the pinion bearing cage 60. A portion of the first coupling 96 that is disposed in the motor housing 90 may extend away from the axis of rotation 54 and may have a set of fastener holes 136 that may be aligned with corresponding holes on the rotor 94 for receiving a fastener 124. In addition, the first coupling 96 may engage the seal assembly 70 in one or more embodiments.

The second coupling 98 may be fixedly coupled to the first coupling 96 and/or the rotor 94. As such, the rotor 94, first coupling 96, and second coupling 98 may rotate with the pinion 50 about the axis of rotation 54. The second coupling 98 may be spaced apart from the pinion 50 and may be disposed on a side of the first coupling 96 that is disposed opposite the differential assembly 22. The second coupling 98 may or may not be supported by the motor housing 90 as previously discussed. A portion of the second coupling 98 that is disposed in the motor housing 90 may extend away from the axis of rotation 54 and may have a set of fastener holes 138 that may be aligned with corresponding fastener holes 136 on the first coupling 96 for receiving a fastener 124.

Figure 4:
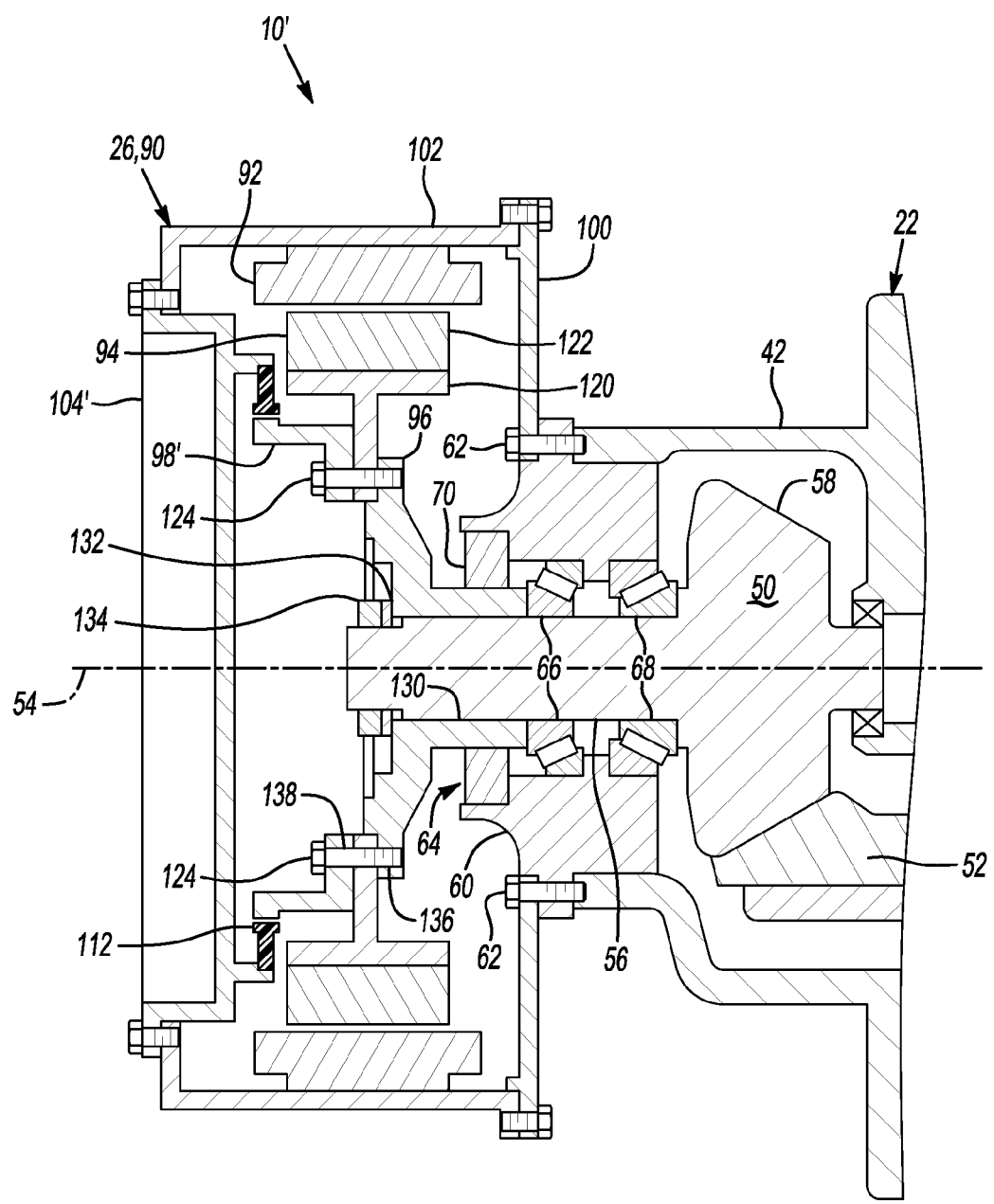
FIGS. 4 and 5 are section views of additional axle assemblies.

Referring to FIG. 4, another embodiment of an axle assembly 10' shown. In this embodiment, a support bearing 110 is not provided and the second coupling 98' and cover plate 104' have a different configuration than the second coupling 98 and cover plate 104 shown in FIG. 3. The second coupling 98' extends away from the axis of rotation 54 and is not rotatably supported by the motor housing 90. In addition, the speed sensor 112 is disposed at a greater radial distance from the axis of rotation 54 than in FIG. 3.

Figure 5:
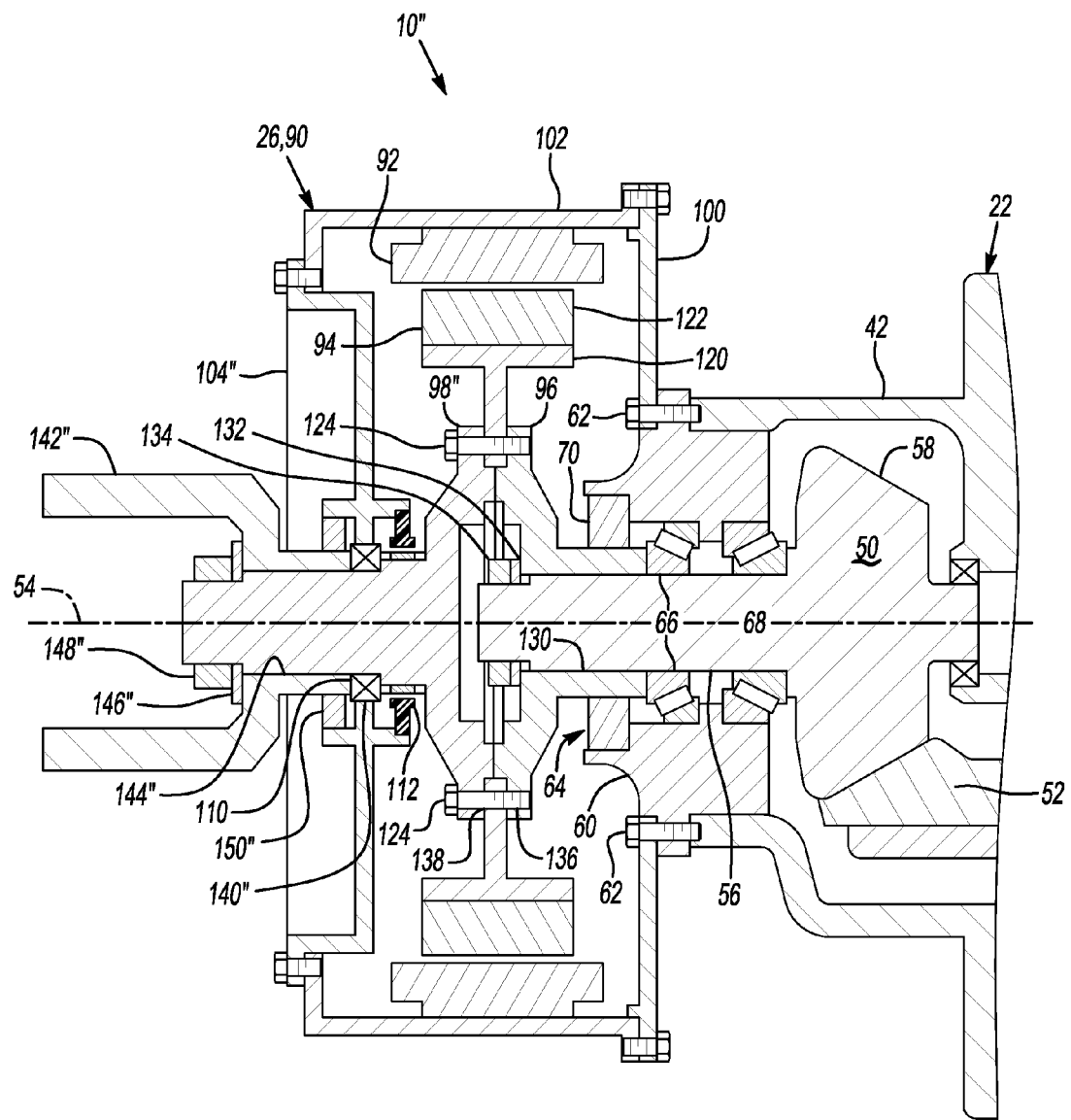

Referring to FIG. 5, another embodiment of an axle assembly 10" is shown. In this embodiment, the cover plate 104" has a cover plate hole 140" through which the second coupling 98" extends. The support bearing 110 may be disposed proximate the cover plate hole 140" to rotatably support the second coupling 98" or may be deleted in one or more embodiments.

An input yoke 142" or other driveline coupling like a flange may be disposed outside the motor housing 90 and may be fixedly coupled to the second coupling 98". For example, the input yoke 142" may have a hole 144" through which the second coupling 98" extends. A spline may be provided in the hole 144" that mates with the spline on the second coupling 98". The mating splines may cooperate to inhibit rotation of the input yoke 142" with respect to the second coupling 98". One or more fasteners, such as a washer 146" and a nut 148", may be provided to inhibit axial movement of the input yoke 142" with respect to the second coupling 98". The input yoke 142" may be coupled to an input shaft, such as a drive shaft or prop shaft, that may be coupled to a torque source, such as a transmission or another axle assembly as previously discussed.

A seal 150" may be provided to inhibit contaminants from entering the motor housing 90. The seal 150" may be provided between the motor housing 90 and the input yoke 142" and/or second coupling 98". In FIG. 5, the seal 150" extends from the cover plate 104" to an outside surface of the input yoke 142".

In one or more embodiments, the axle assemblies described herein may allow an electric motor module to be provided with an axle assembly with limited changes to an axle housing 20 and associated axle differential carrier components. As such, an electric motor module may be provided as a "bolt-on" option for a drive axle carrier configuration and may allow an axle assembly to be retrofitted with an electric motor module to provide electric drive capabilities. In addition, an axle assembly may be scaled to meet various design specifications and may be provided with or without water cooling and with or without a separate lubrication system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    a differential assembly having a pinion;
    a first coupling that has a hole through which the pinion extends, wherein the first coupling is fixedly coupled to the pinion with a nut that is disposed on the pinion; and
    an electric motor module including:
        a motor housing that is coupled to the differential assembly,
        a stator disposed proximate the motor housing, and
        a rotor that is fixedly coupled to the first coupling.

2. The axle assembly of claim 1 wherein the pinion extends through a hole that is provided in the first coupling.

3. The axle assembly of claim 2 wherein the first coupling is disposed in the motor housing.

4. The axle assembly of claim 1 further comprising a second coupling that is disposed proximate the first coupling, wherein the rotor is disposed between the first and second couplings.

5. The axle assembly of claim 4 wherein the rotor is fixedly coupled to the first and second couplings.

6. The axle assembly of claim 1 wherein the differential assembly further comprises a pinion bearing cage that has an opening through which the pinion extends, wherein the motor housing is fixedly coupled to the pinion bearing cage.

7. The axle assembly of claim 6 wherein the first coupling is disposed in the opening between the pinion and the pinion bearing cage.

8. The axle assembly of claim 6 further comprising a seal assembly that is disposed in the opening and extends between the pinion bearing cage and the first coupling.

9. An axle assembly comprising:
a differential assembly that includes a pinion that is configured to rotate about an axis of rotation;
a first coupling fixedly disposed on the pinion; and
an electric motor module including:
  a motor housing that is coupled to the differential assembly,
  a stator that is disposed proximate the motor housing,
  a rotor that is fixedly coupled to the first coupling and has a rotor mounting plate, and
  a second coupling that is fixedly coupled to the first coupling;
wherein the first and second couplings engage opposite sides of the rotor mounting plate and rotate with the pinion about the axis of rotation.

10. The axle assembly of claim 9 wherein the first coupling engages the second coupling.

11. The axle assembly of claim 9 wherein the second coupling is spaced apart from the pinion.

12. The axle assembly of claim 9 wherein the motor housing supports the second coupling.

13. The axle assembly of claim 12 wherein the motor housing includes a cover plate and a support bearing, wherein the support bearing rotatably supports the second coupling.

14. The axle assembly of claim 13 further comprising a speed sensor that is disposed proximate the cover plate.

15. An axle assembly comprising:
a differential assembly that includes a pinion that is configured to rotate about an axis of rotation;
a first coupling having a hole that receives the pinion; and
an electric motor module disposed proximate the differential assembly, the electric motor module including:
  a motor housing that is fixedly positioned with respect to the differential assembly,
  a stator disposed in the motor housing,
  a second coupling that extends through the motor housing and is fixedly coupled to the first coupling, and
  a rotor that is fixedly coupled to the first and second couplings;
wherein the rotor rotates about the axis of rotation with the first and second couplings.

16. The axle assembly of claim 15 further comprising an axle housing that receives the differential assembly, wherein the motor housing is mounted to the axle housing.

17. The axle assembly of claim 15 wherein the motor housing includes a cover plate that has a cover opening through which the second coupling extends.

18. The axle assembly of claim 17 further comprising a support bearing that is disposed on the cover plate and rotatably supports the second coupling.

19. The axle assembly of claim 15 further comprising an input yoke that is fixedly coupled to the second coupling and disposed outside the motor housing.

20. The axle assembly of claim 19 further comprising a seal that is disposed between the motor housing and the input yoke.

* * * * *